United States Patent [19]
Teague et al.

[11] Patent Number: 5,433,769
[45] Date of Patent: Jul. 18, 1995

[54] ENERGY EFFICIENT PROCESS FOR REMOVING EMISSIONS

[75] Inventors: Beth O. Teague; David F. Mitchell, both of Asheville; Joseph T. Flack, Candler; Dennis G. Shealy, Fletcher, all of N.C.

[73] Assignee: BASF Corporation, Mt. Olive, N.J.

[21] Appl. No.: 159,098

[22] Filed: Nov. 29, 1993

[51] Int. Cl.6 .............................................. B03C 3/014
[52] U.S. Cl. ........................................ 95/67; 8/149.2; 95/69; 95/70; 95/288
[58] Field of Search ................. 95/67, 69, 70, 63, 288; 96/55, 57, 74, 52; 55/267, 269; 8/149.1, 149.2, 149.3

[56] References Cited

U.S. PATENT DOCUMENTS

| | | | |
|---|---|---|---|
| 2,379,518 | 7/1945 | Hall | 95/288 X |
| 2,617,276 | 11/1952 | Gard et al. | 95/288 X |
| 3,622,504 | 11/1971 | Strum | 95/288 |
| 3,998,588 | 12/1976 | Coraor et al. | 8/149.2 X |
| 4,007,024 | 2/1977 | Sallee et al. | 96/65 |
| 4,110,091 | 8/1978 | Daeschler et al. | 95/288 X |
| 4,255,406 | 3/1981 | Isalski et al. | 95/288 X |
| 4,287,138 | 9/1981 | Buckner | 8/149.1 X |
| 4,303,127 | 12/1981 | Freel et al. | 95/288 X |
| 4,484,451 | 11/1984 | Darm | 55/269 X |
| 4,527,343 | 7/1985 | Danneberg | 8/149.3 X |
| 4,642,828 | 2/1987 | Lundberg | 8/149.3 |
| 4,652,988 | 3/1987 | McLain et al. | 96/81 |
| 4,676,807 | 6/1987 | Miller et al. | 55/487 X |
| 4,696,679 | 9/1987 | Albulescu et al. | 96/57 X |
| 4,759,782 | 7/1988 | Miller et al. | 55/487 |
| 4,881,953 | 11/1989 | Prasad et al. | 55/267 X |
| 4,984,317 | 1/1991 | Christ | 8/149.1 |
| 5,282,876 | 2/1994 | Murphy et al. | 95/288 |

FOREIGN PATENT DOCUMENTS

| | | |
|---|---|---|
| 0208515 | 1/1987 | European Pat. Off. . |
| 3907437 | 7/1989 | Germany . |
| 1569073 | 6/1980 | United Kingdom . |

OTHER PUBLICATIONS

Wringer-The Ultimate Outdoor Air Machine Brochure, Des Champs Laboratories Incorporated, 1992.
Trion Electronic Air Cleaners, Model Series 60, Trion, Inc., Sanford, N.C., Jan. 1991.
Trion Electronic Air Cleaners, Model 71 Series, Trion, Inc., Sanford, N.C., Jan. 1991.
EPS, Inc., Pollution Control System for Tenter Frame Emissions, Sep., 1991.
Trion, Inc., Application Study, Textile-Tenter Frame Exhaust, Nov., 1993.

*Primary Examiner*—Richard L. Chiesa
*Attorney, Agent, or Firm*—Nixon & Vanderhye

[57] ABSTRACT

Disclosed is a process for removing emissions, originated in the manufacturing industry, especially from polymerization operations and thermoplastic polymer processing operations which includes collecting the air, containing the emissions, directing the air, containing the emissions through a first heat exchanger thereby cooling the air, directing the air, exiting the first heat exchanger, through a second heat exchanger, thereby cooling the air, directing the air exiting the second heat exchanger to a liquid removal system and directing the air, exiting the liquid removal system through the first heat exchanger, thereby heating the air.

25 Claims, 5 Drawing Sheets

ENERGY EFFICIENT PROCESS FOR REMOVING EMISSIONS

FIELD OF THE INVENTION

The present invention relates generally to a process for removing emissions which originate in various manufacturing industries, such as the chemical, pharmaceutical, coatings, recycling and oil industries. Especially, it relates to a process which is suitable for removing monomer, oligomer, additives and water emissions before, during and after the polymerization reaction for the manufacture of thermoplastic polymers and during thermoplastic polymer processing operations like extrusion, injection molding and fiber spinning operations.

BACKGROUND OF THE INVENTION

In the manufacturing industry, like the chemical, pharmaceutical, coating, recycling and oil industry, there exists a broad variety of sources for emissions which are released in the environment, which is not desirable. For example, in chemical reactions, emissions of reaction components, additives and solvents may be released. During coating of cars, vapors of coatings, additives and solvents may be released. During recycling of polymers, monomers or oligomers of the hydrolyzed polymer may be released. During cleaning of reactors, chemicals and solvents may be released.

Before, during and after the polymerization reaction for the manufacture of thermoplastic polymers like polyamides, polyester, polyolefins, polycarbonates, polystyrenes, polyacrylonitriles, polyurethanes, polysulfones, polyethersulfones, polyvinylchloride, copolymers and mixtures thereof, monomer vapors may be released in the environment from transportation tanks, storage tanks, pipelines, ducts, polymerization reactors, polymer melts, polymer strands, water bath, cutters, dryers and the like. During thermoplastic polymer processing like injection molding or extrusion, the thermoplastic polymers are for example extruded through an extruder into strands for chip production or into films, fibers, profiles, tubes and the like. During the extrusion at a temperature of from about 180° to about 350° C., monomer or oligomer vapors, compounds formed by thermal evaporation, thermal decomposition, or vapors of additives are released from the surface of the extruded polymers, which are leaving the nozzle of the extruder. These vapors evaporate immediately into an aerosol that would form deposits in the neighborhood of the extruder and therefore, must be removed, which is usually done by the quench air removal. The exhaust air is usually released in the environment, which is not desirable.

During the manufacture of synthetic yarns, a heat setting step is applied to the yarn for setting a twist in the yarn. In a heat setting unit, heat in form of hot air and/or steam is applied to the yarn. The air and/or steam contains emissions like monomers, oligomers and finish oils, when it exits the heat setting unit, which should be removed.

U.S. Pat. No. 4,676,807 discloses a process for removal of liquid aerosols from gaseous streams by passing the stream through a coalescing filter. In the examples of this patent, oil and water aerosols were tested.

U.S. Pat. No. 4,759,782 which is a C.I.P. of an application which issued as U.S. Pat. No. 4,676,807 described above, discloses the coalescing filter for removal of liquid aerosols from gaseous streams.

The technical bulletin Wringer ®, Des Champs Laboratories Inc., VA, describes a process for the dehumidification of air.

An object of the present invention was to provide a process for removing emissions from a broad variety of emission sources.

Another object of the present invention was to provide a process for removing of emissions from polymerization operations and thermoplastic polymer processing operations.

Another object was a process for removing emissions from fiber spinning operations.

Another object was a process for removing emissions from a heat setting operation for the manufacture of synthetic yarns.

Still another object was a process for removing emissions from a heat setting operation for the manufacture of polycaprolactam yarns.

SUMMARY OF THE INVENTION

The objects of the present invention could be achieved with a process for removing emissions, which comprises:
 a) collecting air, containing the emissions;
 b) directing the air, containing the emissions through a heat exchanger, thereby cooling the air;
 c) directing the air, exiting the heat exchanger, through a means for cooling the air;
 d) directing the air, exiting the means for cooling the air to a means for removing liquid droplets from the air; and
 e) directing the air, exiting the means for removing liquid droplets through the heat exchanger of step (b), thereby heating the air.

DESCRIPTION OF THE PREFERRED EMBODIMENTS

The apparatus for the process of the present invention is suitable for removing emissions from a broad variety of emission sources in the manufacturing industry like the chemical, pharmaceutical, coating, recycling and oil industry. The following example from the chemical industry show the applicability of the process for removing emissions which are released before, during and after the polymerization reaction for the manufacture of polymers and during the thermoplastic processing of polymers into polymer articles.

Articles, made from thermoplastic polymers, like polyamides, polyesters, polyolefins, polycarbonate, polyacrylonitrile, polyurethane, polysulfons, polyethersulfones, polyvinylchloride and the like are manufactured in several steps. One step is the polymerization of monomers to a thermoplastic polymer, followed by the thermoplastic processing into the final shape of the article.

Figure 1:
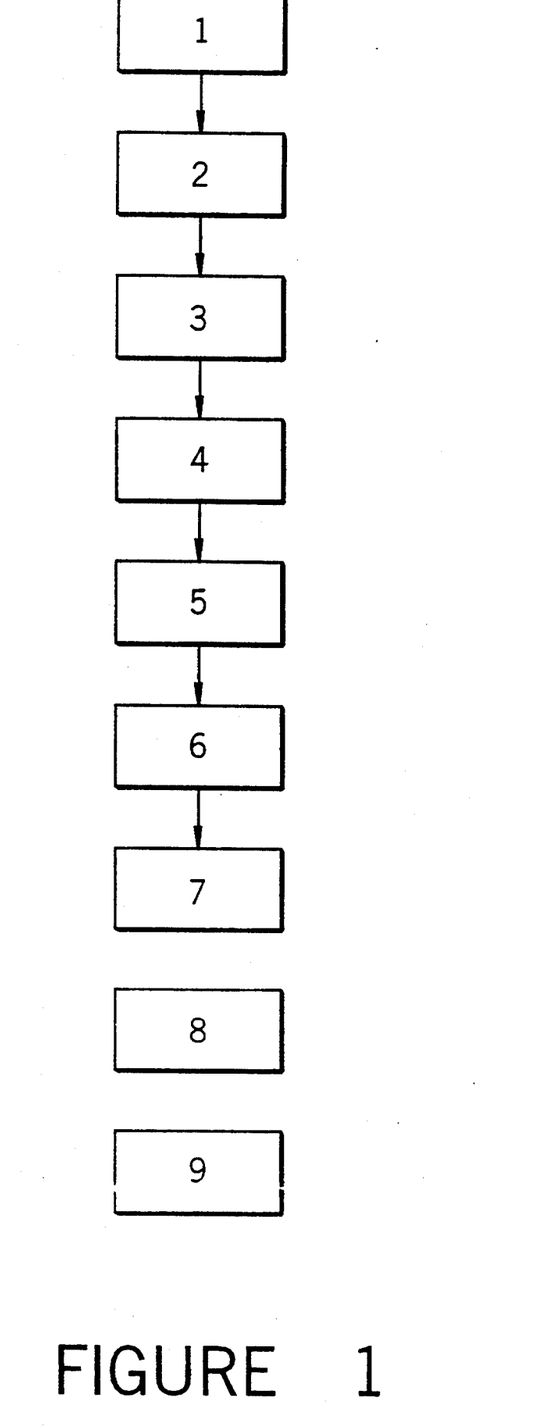
FIG. 1 is a flow chart of a polymerization operation and a thermoplastic processing operation.

FIG. 1 shows a general flow chart for the manufacture of such articles including a polymerization operation comprising the feedstock transfer (1), the feedstock processing (2), the reactor (3) and the polymer processing (4) as well as a thermoplastic processing operation comprising the thermoplastic processing (5), conditioning (6) and the final thermoplastic polymer product (7). Also included in the operation is a cleaning operation (8) and a recycling operation (9).

The feedstock transfer (1) includes the monomer transport via pipeline, truck, rail, drum, sack and the like. The feedstock processing (2) comprises storage tanks, mixing and conditioning of monomers. The reactor (3) comprises the reaction chamber where the polymerization reaction takes place and all the peripheral equipment like columns and pipes. After the polymerization is finished the polymer melt exits the reactor and is transformed into chips, flakes or granules in the polymer processing (4) which comprises pump blocks where the polymer melt is formed into polymer strands, a water bath for cooling the polymer strands, a cutter for cutting the polymer strands into chips and a dryer to dry the chips. In fluidized bed reactors for the manufacture of for example polyolefins, the polymer is formed into granules, which exit the reactor without further polymer processing (4).

In the thermoplastic processing operation, the thermoplastic polymer is melted, for example, in an extruder or injection molding machine which is shown as thermoplastic processing (5). The polymer exits the injection molding machine in form of a shaped article. The polymer melt exits the extruder in form of strands, films, fibers, profiles, tubes and the like, which are conditioned in the conditioning (6), which includes the treatment with quench air, finish application, drawing, texturizing, heat setting and the like to form the final thermoplastic article (7). In all seven stages, emissions may be released in the environment like monomers, oligomers, additives like finish oils, solvents, decomposition products and the like. For example emissions of monomers may be released during feedstock transfer from pipelines, trucks, rails or drums from vents of storage tanks or reactors, during polymer processing, during thermoplastic processing from the exit of the extruder or injection molding machine, during conditioning of for example fibers with regard to quenching, finish application or heat setting.

Emissions may be released also in cleaning operations (8) of the equipment used in (1) to (7) and (9) and in recycling operations (9), where thermoplastic polymer is depolymerized in monomers, the monomers are recovered and again polymerized. The process of the present invention is applicable to all emission sources, originated in polymerization operations, thermoplastic processing operations, cleaning operations or recycling operations, especially multicomponent air streams containing caprolactam emissions, finish oils and water.

The following is a description of the apparatus for the process of the present invention applied to heat setting of synthetic yarns as one example of the above mentioned multiplicity of possibilities for emissions.

One apparatus for the process of the present invention for removal of emissions from heat setting of synthetic yarns is described with reference to FIG. 2.

Figure 2:
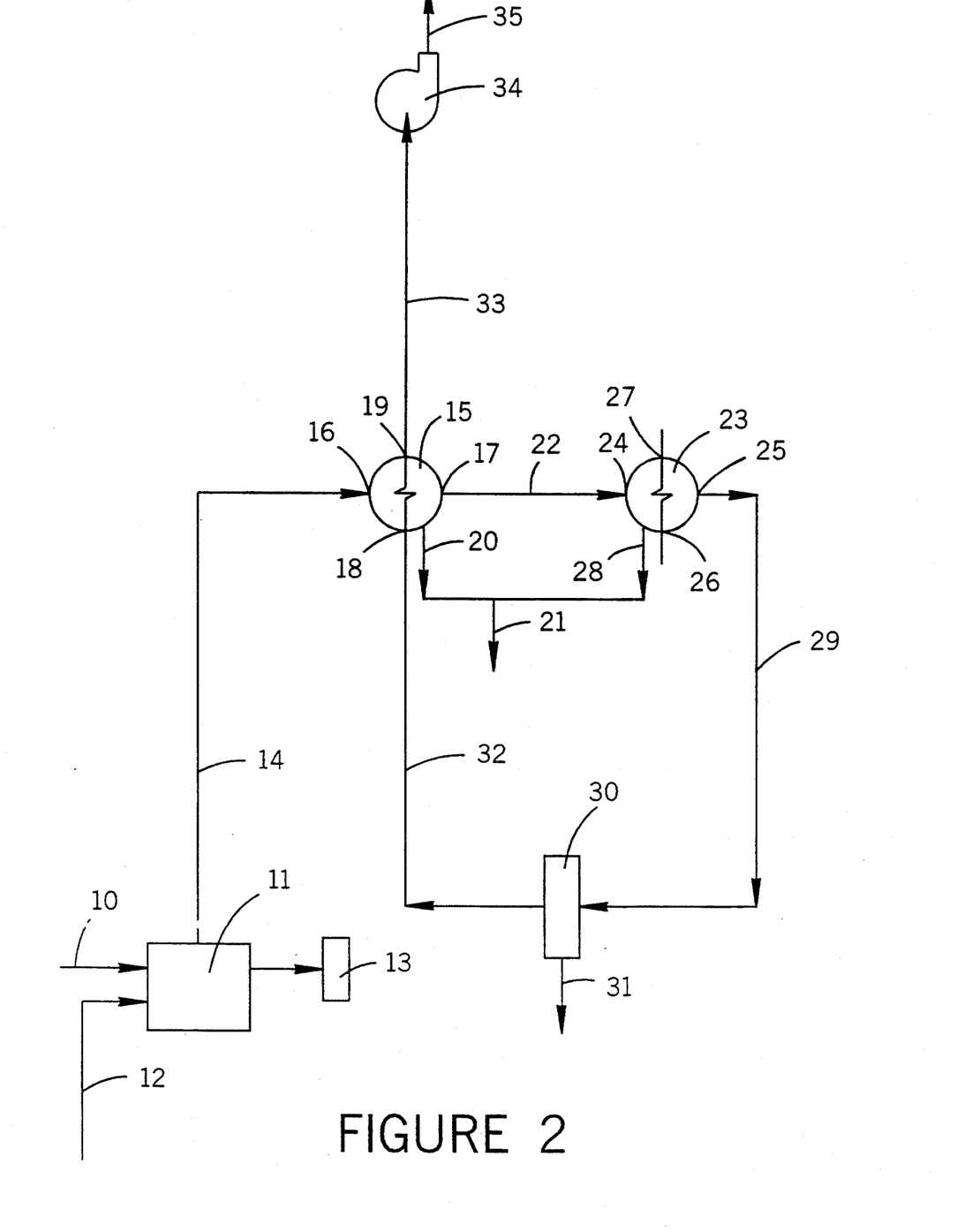
FIG. 2 is a schematic view of an apparatus for the process of the present invention for removing emissions from a heat setting unit for synthetic yarns with two heat exchangers and a liquid removal system located between the second and the first heat exchanger.

FIG. 2 shows a heat setting operation for the heat setting of synthetic yarns and a process for removing emissions originated in the heat setting operation. Twisted yarn (10) is heat set in the heating chamber (11) with hot air and/or steam, from duct (12), followed by winding up on a package (13). The hot air and/or steam, containing the emissions from the yarn (10), exits the heating chamber (11) over duct (14) and is directed to the first heat exchanger (15), where it is cooled and which has a hot side with an entrance (16) and an exit (17) and a cold side with an entrance (18) and an exit (19).

In the first heat exchanger (15), a part of the emissions condenses and is removed over pipes (20) and (21).

The cooled air exits the first heat exchanger (15) at exit (17) and is directed via duct (22) to the second heat exchanger (23), which has a hot side with an entrance (24) and an exit (25) and a cold side with an entrance (26) and an exit (27). The air is further cooled in this second heat exchanger (23) and consensibles are removed over pipes (28) and (21). The second heat exchanger is cooled with a cooling medium like air, water, an aqueous solution, an organic solvent, an inorganic solvent and the like. The cooled air exiting the hot side of the second heat exchanger (23) at exit (25) is directed over duct (29) to the liquid removal system (30) for removing liquid droplets from the air. A suitable liquid removal system (30) is an electrostatic precipitator, a mist eliminator such as a demister pad, a mesh pad and the like, a fiberbed filter and combinations thereof. Preferred is an electrostatic precipitator, a mist eliminator and a combination of a mist eliminator and an electrostatic precipitator, connected by a duct to each other. The term duct also includes connections of all kinds and/or shapes between two units for the transport of air and is not limited to tubes. Condensates in the liquid removal system (30) are removed over pipes (31).

The air, exiting the liquid removal system (30) is directed over duct (32) to the first heat exchanger (15), wherein the air is heated by the incoming hot air from duct (14) through entrance (16) thereby cooling the incoming hot air. Condensibles are removed over pipes (23) and (17). The heated air, exiting the first heat exchanger (15) at exit (19) is directed over duct (33) to the exhaust duct (35) by the fan (34).

Figure 3:
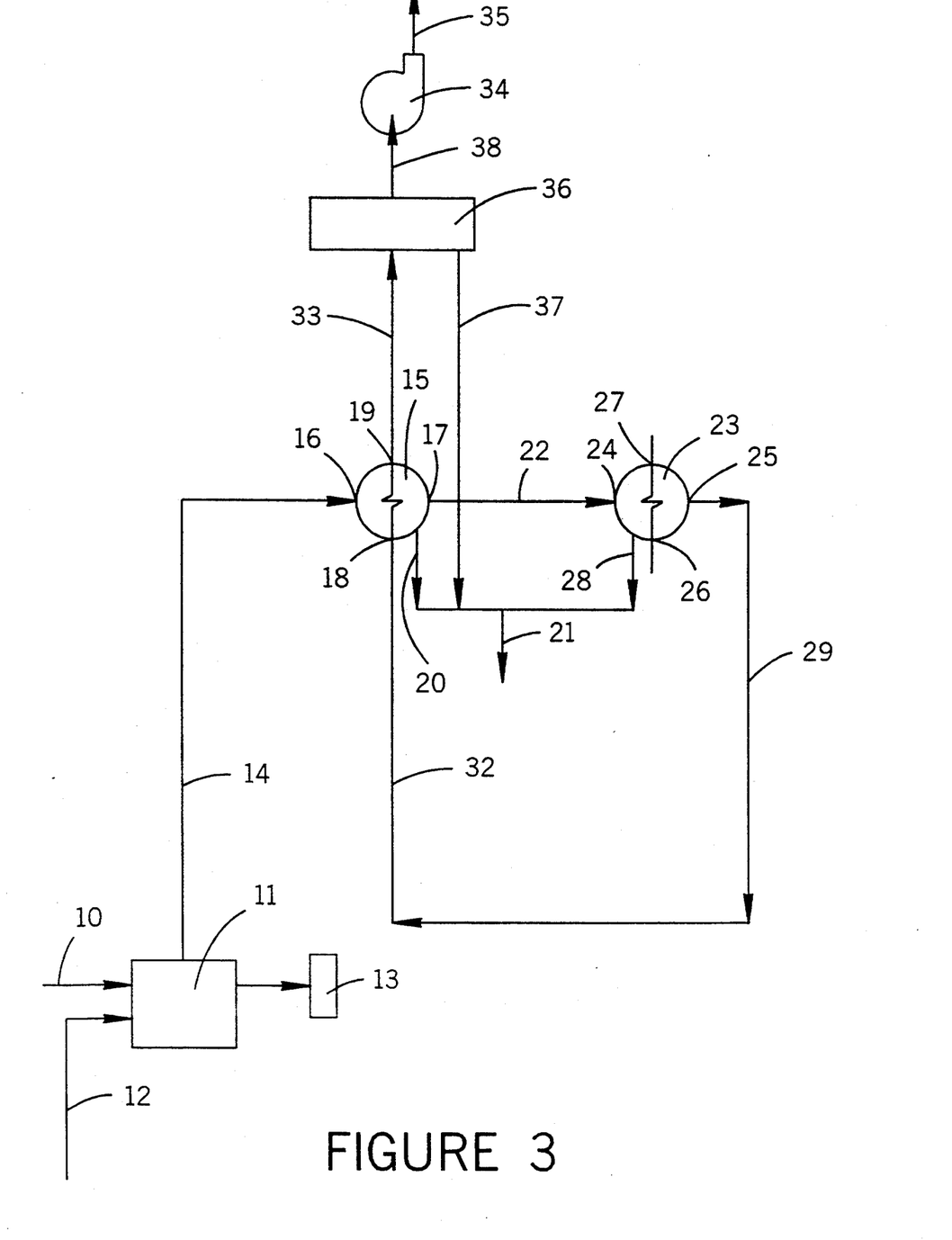
FIG. 3 is a schematic view of a modified apparatus for the process of the present invention, wherein the liquid removal system is located between the first heat exchanger and the fan.

FIG. 3 shows a modification of the apparatus, shown in FIG. 2. In this modified apparatus, the liquid removal system (36) is located between the first heat exchanger (15) and the fan (34), so that the air exiting the cool side of the first heat exchanger (15) at the exit (19) is directed over duct (33), to the liquid removal system (36). A suitable liquid removal system (36) is an electrostatic precipitator, a mist eliminator such as a demister pad, a mesh pad and the like, a fiberbed filter and combinations thereof. Preferred is an electrostatic precipitator, a mist eliminator and a combination of a mist eliminator and an electrostatic precipitator, connected by a duct to each other. Condensibles in the liquid removal system (36) are removed over pipes (37) and (21).

The air exiting the liquid removal system (36) is directed over duct (38) to the exhaust duct (35) by the fan (34). The remaining parts of the apparatus are identical to the apparatus described in FIG. 2.

Figure 4:
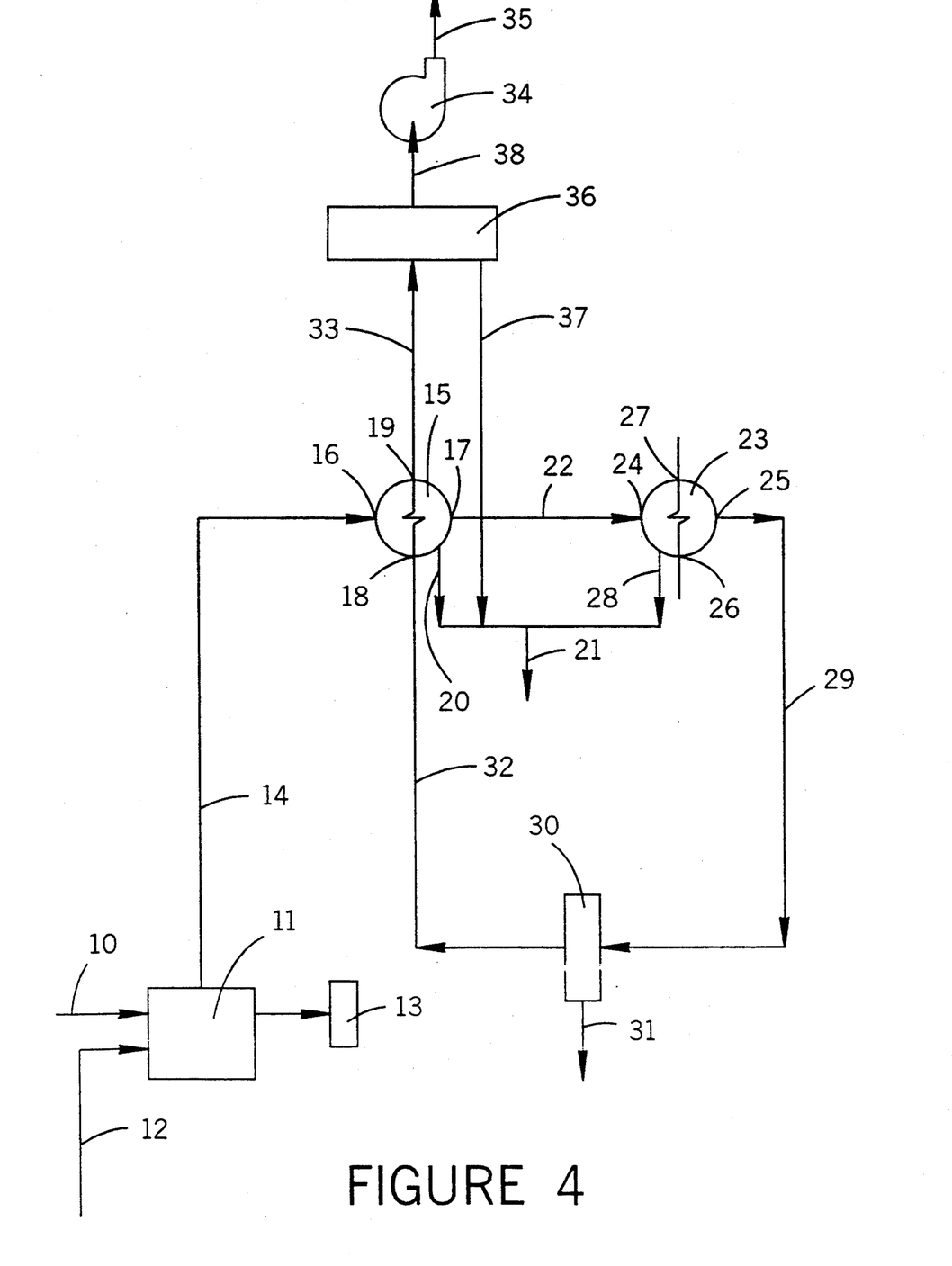
FIG. 4 is a schematic view of another modified apparatus for the process of the present invention, which has two liquid removal systems.

FIG. 4 shows a combination of the apparatus shown in FIG. 2 and FIG. 3, having two liquid removal systems (30) and (36), which parts are described above.

Figure 5:
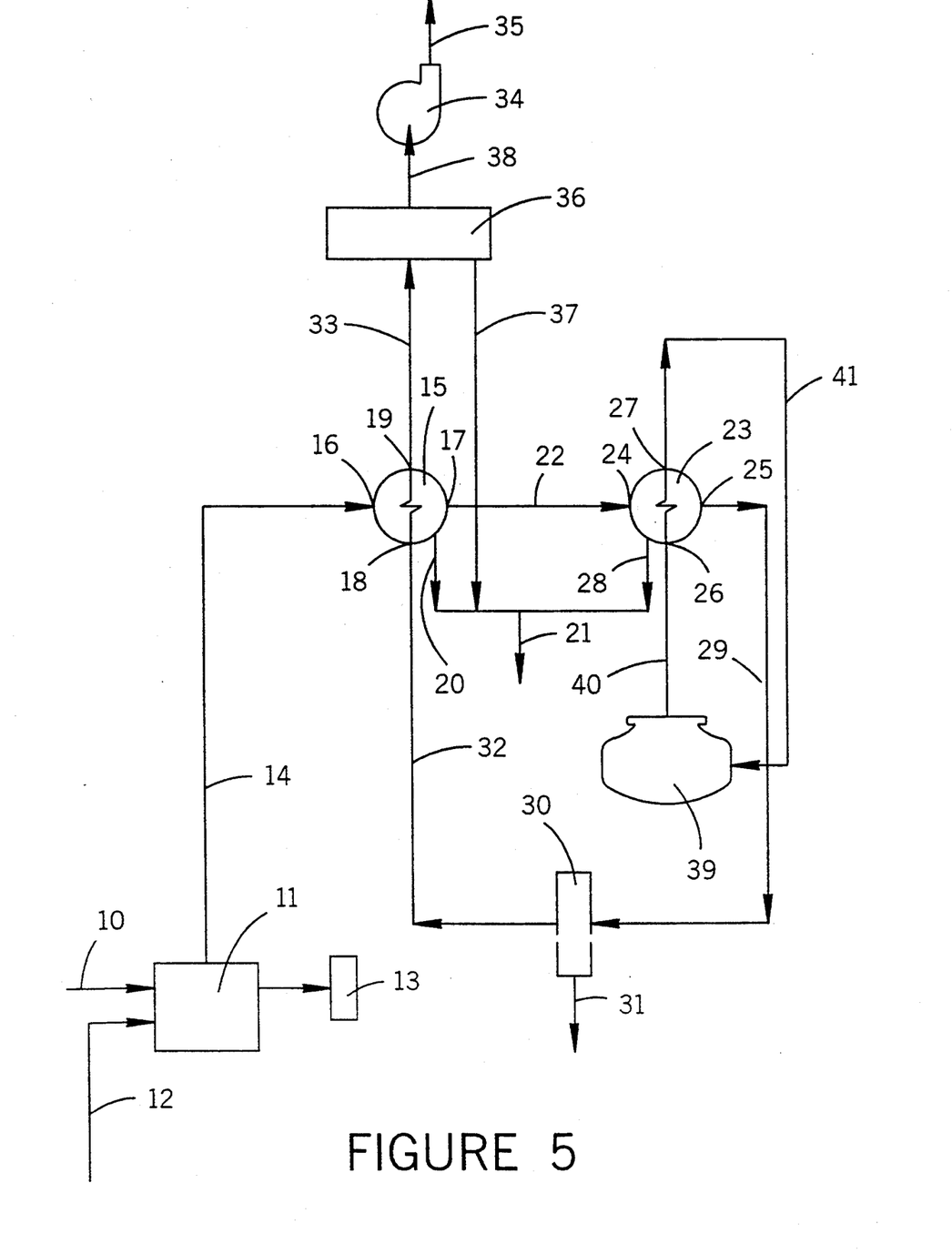
FIG. 5 is a schematic view of the apparatus shown in FIG. 2, wherein a cooling tower is connected to the second heat exchanger.

FIG. 5 shows another modification of the apparatus, shown in FIG. 4, which includes a cooling tower (39) for cooling the water for the cold side of the second heat exchanger (23). Cooled water from the cooling tower (39) is directed over pipe (40) to the entrance (26) of the cold side of the second heat exchanger (23), where it cools the incoming hot air from duct (22) which enters the second heat exchanger (23) at entrance (24) and the cooling tower water is thereby heated. The heated water exits the second heat exchanger (23) at exit (27), and is recirculated through pipe (41) to the cooling tower (39). The remaining parts are identical to the apparatus shown in FIG. 4 and described in FIG. 2 and FIG. 3.

The apparatus for the process of the present invention is applicable to the polymerization and thermoplastic processing of all thermoplastic polymers, especially polyamides, polyesters, polyolefins, polycarbonates, polystyrenes, polyacrylonitriles, polyurethanes, polysulfones, polyethersulfones, polyvinylchloride, copolymers and mixtures thereof.

For the manufacture of fibers all fiber forming thermoplastic materials are suitable, especially polyamides, polyesters, polyolefins, polycarbonate and polyacrylonitrile.

Suitable polyamides are nylon 6, nylon 6/6, nylon 6/9, nylon 6/10, nylon 6/12, nylon 11, nylon 12, copolymers thereof and mixtures thereof. Preferred polyamides are nylon 6 and nylon 6/6. A suitable polyester is polyethylene terephthalate.

For the manufacture of fibers, the polymer is fed into an extruder in form of chips or granules, or as molten resin, melted and directed via jacketed Dowtherm ® (Dow Chemical, Midland Mich.) heated polymer distribution lines to the spinning head. The polymer melt is then metered by a high efficiency gear pump to spin pack assembly and extruded through a spinnerette. The fibers are spun at a temperature of from about 180° to 350° C. according to the respective polymer with a spinning speed of from about 1000 to about 5000 m/min, dependant on the type of polymer.

In the heatsetting process the yarn is placed on a conveying belt (not shown in the FIG.'s) and sent through the heating chamber (11) in which hot air with or without steam is circulated around the yarn. This process sets the twist in the yarn, as well as improving its dyeability. During this process, emissions like monomers and/or oligomers and/or finish oil are released. In the case of polycaprolactam, caprolactam and finish oil is released.

In step (a) of the process of the present invention, which is described with reference to FIG. 2, air, containing the emissions, is collected at the exit of the heating chamber (11). The air in duct (14) has a temperature of from about 40° to about 300° C., preferably from about 45° to about 170° C. The air, containing the emissions, is directed in step (b) through duct (14) to the hot side of the first heat exchanger (15) in which the air is cooled to a temperature of from about 21° to about 90° C., preferably from about 32° to about 71° C. Condensation occurs in this first heat exchanger (15) and the condensate is removed over ducts (20) and (21). A suitable heat exchanger for cooling the air coming out of duct (14) is the Wringer ® unit from Des Champs Laboratories, VA.

The air exiting the first heat exchanger (15) is directed in step (c) to the means for cooling the air, where it is further cooled to about 0.1° to 65° C. preferably to about 4.0° to about 54° C. Suitable means for cooling the air are cooler, heat exchanger and the like. If a second heat exchanger is used as a means for cooling the air (23), it is cooled with a cooling medium like air, water, an aqueous solution, an organic solvent, an an organic solvent and the like. The heat transferred to the cooling medium can be rejected by a cooling tower or another heat exchanger. Suitable heat exchangers are air to air counterflow heat exchangers like the Z-Duct, series 84-1000 from Des Champs Laboratories, VA or coil heat exchanger from Marlo Coil with a cooling tower and water as a cooling medium.

The cooled air exiting the means for cooling the air (23) is directed in step (d) to the liquid removal system (30), where liquid droplets are removed from the air. Suitable liquid removal systems are an electrostatic precipitator, a mist eliminator such as a demister pad, mesh pad and the like, a fiber bed filter and combinations thereof. Suitable liquid removal systems are electrostatic precipitators like those from United Air Specialists, Trion, and Beltran; mist eliminators like mesh filters such as Permanent Heavy Duty Air or Grease Filters by Rutzler; and fiberbed filters like those from KOCH, and combinations thereof. Preferred is an electrostatic precipitator, a mist eliminator or a combination of a mist eliminator and an electrostatic precipitator, being connected by a duct to each other.

The air leaving the liquid removal system (30) is directed to the cool side of the first heat exchanger (15), where it is heated by the incoming hot air from duct (14) to a temperature measured at exit (19) of from about 4° to about 93° C., preferably to a temperature of from about 10° to 77° C. The air exiting the cool side of the heat exchanger (15) at exit (19) is directed over duct (33) by fan (34) to the exhaust duct (35) and released in the environment.

In an alternative process in accordance with FIG. 3, the air exiting the means for cooling the air in step (c) is directed to the entrance (18) of the cool side of the heat exchanger (15), wherein it is heated to a temperature, measured at exit (19) of from about 4° to about 93° C., preferably to about 10° to about 77° C. The heated air exiting the cool side of the first heat exchanger (15) at exit (19) is directed to the means for removing liquid droplets from the air (36), which is of the same description as the liquid removal system (30), described in the process with reference to FIG. 2. Preferred is an electrostatic precipitator, a mist eliminator or a combination of a mist eliminator and an electrostatic precipitator. In this liquid removal system (36) liquid droplets are removed from the air and exit over pipes (37) and (21). The air leaving the means for removing liquid droplets from the air is directed over duct (38) by the fan (34) to the exhaust duct (35) and released in the environment. Steps (a) (b) and (c) are identical with the process described with reference to FIG. 2.

In another alternative process in accordance with FIG. 4, the air exiting the cool side of the first heat exchanger in step (e) is directed to a second means for removing liquid droplets (36), which is of the same description as the liquid removal system (30), described in the process with reference to FIG. 2. Preferred is an electrostatic precipitator, a mist eliminator or a combination of a mist eliminator and an electrostatic precipitator.

In this second liquid removal system (36), remaining liquid droplets are removed from the air and directed over pipes (37) and (21). The steps (a) (b) (c) (d) and (e) remain the same as in the process described with reference to FIG. 2. Because of this additional liquid droplet removal this alternative process is more effective than the other alternatives, described above.

An alternative way in cooling the means for cooling the air (23) is described with reference to FIG. 5. A cooling tower (39) is used to supply cooling tower water through pipe (40) as the cooling media in the second means for cooling the air (23). If a heat exchanger is used as shown in FIG. 5, the cooling tower water is directed from the cooling tower (39) over pipe (40) to the cool side of the heat exchanger (23) over entrance (26). The heated water exiting the cool side of the heat exchanger (23) at exit (27) is recirculated through pipe (41) to the cooling tower (39).

In all processes, described above, the opacity of the air is reduced from greater than 25% entering the system unit at duct (14) to less than 5% exiting the system at duct (26). The exhaust air is estimated to have less than 20% by volume of caprolactam emissions and less than 20% by volume of finish oil emissions.

EXAMPLE 1:

Nylon 6 carpet yarn (Ultramid ® B of BASF AG, Germany, with a relative viscosity of 2.5, measured as a 1% by weight solution in 90% formic acid at 25° C.) was heat set in two heat setting units from Suessen.

The combined through put of fiber was 284 kg/hr. Steam injected into each heatsetting unit at a rate of 483 kg/hr. The air containing the emissions at the exit of the heating chamber has a flow rate of 67 m³/min, a temperature of 103° C. dry bulb and 72° C. wet bulb, and consisted of air, water vapor, caprolactam, and finish oil. This air stream is cooled in the first heat exchanger, which was a Wringer unit, manufactured by Des Champes Laboratories consisting of an air-to-air Z-Duct® series 84-1000 heat exchanger followed by an air-to-water heat exchanger, with Marlo cooling coils. The air stream leaving the Suessen heatsetting units was cooled to saturation by the first air-to-air heat exchanger to 72° C. dry and wet bulb. The air leaving the first heat exchanger was further cooled by a second heat exchanger, an air-to-water heat exchanger containing Marlo cooling coils with 0.5 m³/min. and 25.6° C. cooling tower water from an Amcot cooling tower to an air temperature of 43° C. dry and wet bulb. Approximately 0.02 m³/min. condensate was formed from both heat exchangers. The air was directed a mesh-type Permanent Heavy Duty Air or Grease Filter mist eliminator by Rutzler. The air leaving the mist eliminator was directed to the first air-to-air heat exchanger to serve as the cooling medium for the air stream leaving the Suessens. The first heat exchanger also served as a medium for heating the air leaving the mist eliminator to an exit temperature of 66° C. dry bulb and 42° C. wet bulb before entering the electrostatic precipitator by Thiel Industries The air exiting the electrostatic precipitator was then exhausted by a fan to the exhaust duct.

We claim:

1. A process for removing fiber finish oil emissions entrained in a moisture-laden air stream obtained from a synthetic fiber processing system and for reducing opacity of the air stream so that the air stream may be exhausted to atmosphere, said process comprising:

(a) collecting the fiber finish oil emissions-containing moisture-laden air stream;

(b) directing the fiber finish oil emissions-containing moisture-laden air stream through a cooling system which includes first and second heat exchangers fluid-connected in series with one another so as to bring the air stream into heat exchange relationship with first and second heat-exchange fluids, respectively, to thereby cool the air stream to a moisture saturation temperature at which moisture contained in the air stream condenses to liquid so as to form a first aqueous liquid condensate stream, and an air discharge stream which is discharged from said second heat exchanger mad contains moisture-saturated air and liquid droplets of said fiber finish oil emissions; and (c) directing the air discharge stream to a liquid removal system to remove said liquid droplets of said fiber finish oil emissions from the air discharge stream and form a second aqueous liquid condensate stream containing a substantial portion of said fiber finish oil emissions; and (d) directing said air discharge stream to said first heat exchanger so that said air discharge stream serves as said first heat-exchange fluid in heat-exchange relationship with said fiber finish oil emissions-containing moisture-laden air stream such that heat transferred to said air discharge stream from said fiber finish oil emissions-containing moisture-laden air stream causes said air discharge stream to be heated to an extent to cause air saturation of the air discharge stream and thereby form an exhaust air stream having reduced opacity which may be released to atmosphere.

2. The process according to claim 1, wherein the air discharge stream is directed sequentially through the first heat exchanger and then to the liquid removal system to remove said liquid droplets from the air discharge stream.

3. The process according to claim 1 or 2, wherein said liquid removal system includes first and second liquid removal units for removing liquid droplets from the air, and wherein step (c) is practiced by directing the air discharge stream through said first and second liquid removal units.

4. The process according to claim 3, wherein the first and second liquid removal units are each selected from the group consisting of an electrostatic precipitator, a mist eliminator, and a fiberbed filter.

5. The process according to claim 3, wherein at least one of the first and second liquid removal units is an electrostatic precipitator.

6. The process according to claim 3, wherein one of the first and second liquid removal units is a mist eliminator and the other of said first and second liquid removal units is an electrostatic precipitator.

7. The process according to claim 1, wherein the liquid removal system includes at least one liquid removal unit selected from the group consisting of an electrostatic precipitator, a mist eliminator, and a fiberbed filter.

8. The process according to claim 1, wherein the liquid removal system is an electrostatic precipitator.

9. The process according to claim 1, wherein the liquid removal system includes both a mist eliminator and an electrostatic precipitator.

10. The process according to claim 1, wherein the emissions-containing moisture-laden air stream has a temperature of from about 40° to about 300° C.

11. The process according to claim 1, wherein step (b) is practiced so as to cool the air stream in the first heat exchanger to a temperature between about 21° to 90° C.

12. The process according to claim 1 or 11, wherein step (b) is practiced so as to cool the air stream in the second heat exchanger to a temperature between about 0.1° to about 65° C.

13. The process according to claim 1, wherein the air discharge stream is heated in the first heat exchanger to a temperature between about 4° to about 93° C.

14. The process according to claim 1, wherein the synthetic fiber processing system processes synthetic fibers formed of a thermoplastic polymer which is at least one selected from the group consisting of polyamides, polyesters, polyolefins, polycarbonates, polystyrenes, polyacrylonitriles, polyurethanes, polysulfones, polyethersulfones, and polyvinylchloride.

15. The process according to claim 1 or 14, wherein the synthetic fiber processing system comprise a synthetic fiber spinning operation.

16. The process according to claim 1, wherein the emissions are released from a heatsetting operation for the manufacture of synthetic yarns.

17. The process according to claim 1, wherein the emissions are released from a heatsetting operation for the manufacture of polycaprolactam yarns.

18. In a heat-setting process for heat-setting twisted nylon carpet yarn by subjecting the nylon carpet yarn to a heated moisture-laden air environment in a heat-setting chamber at a temperature between about 40° to about 300° C. to thereby heat-set the same, the improvement comprising reducing condensable vaporous caprolactam and finish oil emissions contained within an air stream removed from said heated air environment of the heat-setting chamber during heat-setting of said twisted nylon carpet yarn, and reducing opacity of said emissions-containing air stream sufficient to exhaust said air stream to atmosphere, said process comprising:

(a) directing the air stream through a cooling system which includes first mad second heat exchangers fluid-connected to one another in series such that said first heat exchanger receives the moisture-laden air containing condensable vaporous caprolactam and finish oil emissions removed from said heated air environment of said heat-setting chamber and brings the air stream into heat-exchange relationship with a first heat-exchange fluid which cools the air stream to a temperature between about 21° to about 90° C., and thereafter said second heat exchanger receives the air stream from said first heat exchanger and brings the air stream into heat-exchange relationship with a second heat-exchange fluid to further cool the air stream to a temperature between about 0.1° to about 65° C., thereby cooling the air stream to a moisture saturation temperature sufficient to form a liquid aqueous condensate stream containing a condensed portion of said emissions, and an air discharge stream in which a remaining portion of said emissions in the form of liquid droplets is entrained; and (b) directing the air discharge stream through an electrostatic precipitator so as to remove said liquid droplets from said air discharge stream and thereby remove a substantial part of said remaining portion of said emissions entrained therein; and wherein (c) the air discharge stream from said second heat exchanger is recycled to said first heat exchanger as said first heat-exchange fluid so that the moisture-laden air containing condensable vaporous caprolactam and finish oil emissions removed from said heated air environment of said heat-setting chamber heats the air discharge stream to a temperature above its saturation temperature of between about 4° to about 93° C. sufficient to desaturate the air discharge stream of moisture and thereby form an exhaust air stream having a reduced opacity of less than 5% which may be released to atmosphere.

19. In the heat setting process of claim 18, the improvement comprising fluid-connecting said electrostatic precipitator to and between said first and second heat exchangers in the recycle of said air discharge stream from said second heat exchanger to said first heat exchanger.

20. In the heat setting process of claim 18, the improvement comprising fluid-connecting said electrostatic precipitator to and downstream of said first heat exchanger in the air discharge stream.

21. In the heat setting process of claim 18, the improvement comprising positioning a mist eliminator in said air discharge stream in series with said electrostatic precipitator.

22. In the heat setting process of claim 21, the improvement wherein said mist eliminator is fluid-connected to said electrostatic precipitator upstream of said electrostatic precipitator.

23. In the heat setting process of claim 21, the improvement wherein said mist eliminator is fluid-connected to said electrostatic precipitator downstream of said electrostatic precipitator.

24. In the heat setting process as in any one of claims 18–23, the improvement further comprising directing the second heat-exchange fluid discharged from the second heat exchanger through a cooling tower so as to cool said second heat exchange fluid, and then supplying the cooled second heat exchange fluid from said cooling tower to said second heat exchanger.

25. In the heat setting process of claim 22, the improvement wherein said second heat exchange fluid is water.

* * * * *